United States Patent
Campagna et al.

(10) Patent No.: US 8,453,176 B2
(45) Date of Patent: May 28, 2013

(54) OCAP/STB ACAP/SATELLITE-RECEIVER AUDIENCE RESPONSE/CONSUMER APPLICATION

(75) Inventors: Theresa Campagna, Philadelphia, PA (US); David Chavez, Broomfield, CO (US); David Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 236 days.

(21) Appl. No.: 12/883,303

(22) Filed: Sep. 16, 2010

(65) Prior Publication Data

US 2012/0047525 A1    Feb. 23, 2012

Related U.S. Application Data

(60) Provisional application No. 61/375,335, filed on Aug. 20, 2010.

(51) Int. Cl.
  *G06F 13/00* (2006.01)
  *G06F 3/00* (2006.01)
  *H04N 5/445* (2011.01)

(52) U.S. Cl.
  USPC .......... 725/46; 725/37; 725/38; 725/39; 725/44; 725/51

(58) Field of Classification Search
  USPC ............................................. 725/46
  See application file for complete search history.

(56) References Cited

U.S. PATENT DOCUMENTS

| | | | |
|---|---|---|---|
| 6,530,082 B1 | 3/2003 | Del Sesto et al. | |
| 2003/0051254 A1* | 3/2003 | Weidenfeller | 725/118 |
| 2004/0031052 A1 | 2/2004 | Wannamaker et al. | |
| 2005/0138658 A1* | 6/2005 | Bryan | 725/46 |
| 2005/0149987 A1* | 7/2005 | Boccon-Gibod et al. | 725/135 |
| 2006/0020973 A1* | 1/2006 | Hannum et al. | 725/46 |
| 2007/0180459 A1 | 8/2007 | Smithpeters et al. | |
| 2008/0091512 A1 | 4/2008 | Marci et al. | |
| 2008/0098433 A1 | 4/2008 | Hardacker et al. | |
| 2008/0118086 A1 | 5/2008 | Krig | |
| 2008/0134256 A1* | 6/2008 | DaCosta | 725/62 |
| 2009/0193482 A1* | 7/2009 | White et al. | 725/110 |
| 2009/0241153 A1 | 9/2009 | Campagna et al. | |
| 2009/0241158 A1 | 9/2009 | Campagna et al. | |
| 2009/0241159 A1 | 9/2009 | Campagna et al. | |
| 2009/0241160 A1 | 9/2009 | Campagna et al. | |

FOREIGN PATENT DOCUMENTS

GB    2452519    3/2009

OTHER PUBLICATIONS

"OpenCable Application Platform Specifications: OCAP 1.1 Profile" Aug. 7, 2008, pp. 1-636; Cable Television Laboratories, Inc., 2006-2008.
Search Report for United Kingdom Patent Application No. GB1114300.5, dated Dec. 6, 2011 3 pages.

* cited by examiner

*Primary Examiner* — Justin Shepard
(74) *Attorney, Agent, or Firm* — Sheridan Ross P.C.

(57) ABSTRACT

An exemplary aspect is directed toward one or more solutions that are capable of providing feedback information about OCAP/ACAP/IMS solutions generally related to audience acceptance and satisfaction, and extensions thereto. For example, one exemplary aspect is directed toward information, such as consumer feedback about their viewing choices, being gathered, evaluated and distributed. Even more specifically, an exemplary aspect is directed toward the use of information, such as personalized or customized information and personal preferences contained in an STB combined with an OCAP/ACAP/IMS intelligent personal agent and application(s) to provide advanced interactive and interoperable services to both obtain and distribute feedback about OCAP/ACAP/IMS services.

20 Claims, 6 Drawing Sheets

OCAP/STB ACAP/SATELLITE-RECEIVER AUDIENCE RESPONSE/CONSUMER APPLICATION

RELATED APPLICATION DATA

This application claims the benefit of and priority under 35 U.S.C. §119(e) to U.S. Patent Application No. 61/375,335, filed Aug. 20, 2010, entitled "OCAP/STB ACAP/Satellite-Receiver Audience Response/Consumer Information Application," which is incorporated herein by reference in its entirety.

CROSS-REFERENCE TO RELATED APPLICATIONS

Cross reference is made to:

U.S. patent application Ser. No. 12/050,575, filed Mar. 18, 2008, entitled, "OPEN CABLE APPLICATION PLATFORM SET-TOP BOX (STB) PERSONAL PROFILES AND COMMUNICATIONS APPLICATIONS,";

U.S. patent application Ser. No. 12/050,605, filed Mar. 18, 2008, entitled "OPEN CABLE APPLICATION PLATFORM SET-TOP BOX (STB) PERSONAL PROFILES AND COMMUNICATIONS APPLICATIONS,";

U.S. patent application Ser. No. 12/050,634, filed Mar. 18, 2008, entitled "OPEN CABLE APPLICATION PLATFORM SET-TOP BOX (STB) PERSONAL PROFILES AND COMMUNICATIONS APPLICATIONS,"; and U.S. patent application Ser. No. 12/050,677, filed Mar. 18, 2008, entitled "OPEN CABLE APPLICATION PLATFORM SET-TOP BOX (STB) PERSONAL PROFILES AND COMMUNICATIONS APPLICATIONS," all of which are incorporated herein by reference in their entirety.

FIELD OF THE INVENTION

The invention relates generally to set-top boxes and more particularly to one or more profiles associated with a set-top box. Additional aspects of the invention relate to the interoperability of STB's, one or more profiles and one or more applications associated with the open cable application platform. Even further aspects are directed toward providing advanced interactive and interoperable services to both obtain and distribute feedback about Advanced Common Application Platform (ACAP)/Open Cable Application Platform (OCAP)/Internet Protocol Multimedia Subsystem (IMS) services.

BACKGROUND OF THE INVENTION

Multiple Service Operators (MSOs), e.g., cable companies, are working to transform their value proposition from one dominated by basic subscriptions and equipment leases to a customer service driven value model. One of the reasons for this is the recent ruling by the Federal Communications Commission (FCC), which has been upheld in court, that MSOs adopt the Open Cable Application Platform (OCAP) and that Set-Top Boxes (STBs) be open to other uses. With larger pipes, more powerful STBs, and improved customer service applications residing in those STBs, the MSO can begin to dominate the other Local inter-Exchange Carriers (LECs). This enhanced customer service value equation is viewed to be one key to continued MSO growth, increased revenue and increased margins. OCAP is a new paradigm that will allow MSOs to create, or have made, and deploy, a whole suite of new interactive communications services that can drive new revenue streams with higher margins for the MSOs. The OCAP middleware, written in the Java® language, will facilitate "write once, use anywhere" application software to provide new features and services created by third party developers.

The OpenCable™ Platform specification can be found at http://www.opencable.com/ocap/, "OpenCable Application Platform Specification (OCAP) 1.1," which is incorporated herein by reference in its entirety.

OCAP is an operating system layer designed for consumer electronics, such as STBs, that connect to a cable television system. Generally, the cable company controls what OCAP programs can be run on the STB. OCAP programs can be used for interactive services such as eCommerce, online banking, program guides and digital video recording. Cable companies have required OCAP as part of the CableCard 2.0 specification, and they indicate that two way communications by third party devices on their networks will require them to support OCAP.

More specifically, OCAP is a Java® language-based software/middleware portion of the OpenCable initiative. OCAP is based on the Globally Executable MHP (GEM)-standard, as defined by CableLabs. Because OCAP is based on GEM, OCAP shares many similarities with the Multimedia Home Platform (MHP) standard defined by the Digital Video Broadcasting (DVB)-project. The MHP was developed by the DVB Project as the world's first open standard for interactive television. It is a Java® language-based environment which defines a generic interface between interactive digital applications and the terminals on which those applications execute. MHP was designed to run on DVB platforms but there was a demand to extend the interoperability it offers to other digital television platforms. This demand gave rise to GEM, or Globally Executable MHP, a framework which allows other organizations to define specifications based on MHP.

One such specification is OCAP which has been adopted by the US cable industry. In OCAP the various DVB technologies and specifications that are not used in the US cable environment are removed and replaced by their functional equivalents, as specified in GEM. On the terrestrial broadcast side, CableLabs and the Advanced Television Systems Committee (ATSC) have worked together to define a common GEM-based specification, Advanced Communications Application Platform (ACAP), which will ensure maximum compatibility between cable and over-the-air broadcast receivers.

Packet Cable 2.0 is a specification based on the wireless Third Generation Partnership Program (3GPP) Internet protocol Multimedia Subsystem (IMS), which uses Session Initiated Protocol (SIP) for session control. By using SIP, MSOs can create the foundation of a service delivery platform on top of their existing DOCSIS (Data Over Cable Service Interface Specification) or cable modem service. Two of the SIP features that are particularly important to this invention are extensibility and interoperability. These SIP features are important because new messages and attributes can be easily defined and communications between previously incompatible endpoints are facilitated.

Another development that sets the stage for the disclosed inventions is the processing power, multimedia codecs and storage capabilities of the STBs. Many of the more advanced STBs have Digital Video Recorders (DVRs) based on hard disk drives or flash memory that provide many gigabytes of available storage. They also have advanced audio/video codecs designed to handle the requirements of High Definition Television (HDTV). Processors such as the Broadcom BCM7118 announced in January 2007, provide over 1000 Dhrystone mega-instructions per second (DMIPS) worth of processing power to support OCAP, new customer applications, and DOCSIS 2.0 and DSG advanced mode. The Broadcom chip, and other general purpose and application-specific integrated circuit (ASIC) processors used for STBs, provide powerful security capabilities such as the emerging Polycipher Downloadable Conditional Access Security (DCAS) system. DCAS eliminates the need for a CableCard and supports multiple conditional access systems and retail products.

SUMMARY

These technologies provide the platform for a greatly enhanced, multimedia, customer communication experience. Specifically, one exemplary aspect of this invention is advanced multimedia communications via OCAP using customer specific profiles resident in the STB. Telephony application servers have already been proposed by CableLabs and others. Phone and STB association can be done in the MSO network. Similarly, personalized information for the display of financial data, home security information and the like, is also known.

However, an exemplary aspect of this invention utilizes storage of personalized information and communication preferences in the STB in a structured format or via cookies. The combination of feature rich telephony applications with the personalized data stored in STBs facilitates feature rich communications sessions. Providing advanced multimedia communications applications using personalized data resident in STBs could allow the MSOs to provide, for example, many previously unavailable services, and therefore provide considerable new business potential.

The types of personal information that can be stored in STBs may include, but are not limited to, communication preferences, payment preferences, vendor preferences, priority preferences, personal information, etc. Examples of communications preferences could include when to be reached or not reached, e.g., receive an incoming communication(s), numbers to be reached on, calendar synchronization, etc., and in general any information related to communications. Examples of payment preferences could include credit card information, direct deposit/debit information, what financial instrument was used for the most recent transaction with a specific company, and in general any information related to transactions. Examples of vendor preferences could include favorite delivery pizza, most commonly ordered items, etc. Examples of priority preferences could include conditions like don't interrupt me watching the Chicago Bears beat the Green Bay Packers unless it is my boss calling, and in general any preference that can be used to assist with priority determinations. Examples of personal information could include clothing or shoe size, favorite colors, name, address, etc., and in general any information about an individual(s). Other such personal information categories and variations stored in STBs as can be imagined by one schooled in this art are also within the scope of this invention disclosure.

Screen menus, pushed URLs, and adaptations specific to various devices connected to STBs (such as different size screens, different capability devices, etc.) can be rendered as part of this process of enhanced communications. Similarly contextual favorites or preferences can be provided depending on what content is being displayed or interacted with.

When one combines the integration of a profile, such as, for example, personal information in STBs, with applications resident in a variety of places on the MSO's network, these new value added services are enabled.

A few simple examples of what is possible could include, but are not limited to, enhanced web enabled service transactions, mobile requests for goods or services using the profiles and communication capabilities of the STB/MSO network, display of or sharing of information among two or more individuals, etc.

For example, the user can initiate a service transaction on the STB itself. The exemplary menu based request will use the stored service information entry to key a web service request. If the request should trigger a human response (like communication with a retention agent when service cancellation is requested), then the STB information can key to the customer phone for an outbound call to confirm the cancellation request and allow the agent to describe a retention offer.

Another example could be a user delayed at work wanting to order a pizza to be ready shortly after their arrival at their home. The user can access personal information in their remote STB about their preferred vendor, most recent order and previous method of payment. They can place a new pizza order based on this stored information rather than having to key or speak all this information while driving. The user benefits from an enhanced user experience, the accuracy of the order is improved, and they can have the food arrive closely timed with their own arrival at home.

Another example is when a user has relocated to a new city or state; they may not have had the time to develop favorite vendors for pizza or other goods and services. In such a case, the MSO can push a list of preferred partners to the new user that the new user can edit or modify based on their own personal experiences and preferences.

The exemplary embodiments discussed herein just hint at the power of the proposed enhancement to this new communications paradigm. There are many other potential examples and applications to serve them that are possible.

For example, it is generally recognized that an intelligent agent is a software agent that assists users and will act on their behalf, in performing non-repetitive computer-related tasks. An agent in this sense of the word is like an insurance agent or a travel agent. While the working of software agents used for operator assistance or data mining (sometimes referred to as bots) are often based on fixed pre-programmed rules, "intelligent" in this context is often taken to imply the ability to adapt and learn. The term "personal" indicates that a particular intelligent agent is acting on behalf of an individual or a small collective group of users such as a household, business entity, etc.

OCAP provides another venue for an intelligent personal agent but offers several advantages compared with previous attempts at this type of application. One is the fact that STBs are already equipped to handle two-way, full-motion, High Definition (HD) video, as well as any other communication media. Another advantage is the integration of the personal profile information with the Intelligent Personal Agent application. Another is the improved security discussed herein. The extensibility and the interoperability that the Session Initiation Protocol (SIP) adds to Packet Cable 2.0 allows the full gamut of communications modalities and devices to be leveraged.

Another exemplary aspect of the invention is the use of personalized information and personal preferences contained in a STB in combination with an intelligent personal agent application and improved security to provide, for example, a greatly enhanced user agent experience.

The fact that sensitive information about the user can be stored within their own STB reduces security concerns associated with having too much web presence. The disclosure or query of the personal information can be established on a trust basis which also helps with security and privacy. The push of security information such as DCAS makes the environment significantly safer. One could also envision if there are multiple users within one household, that they can each have a profile that is login protected for personal privacy. Parents would be able to set certain conditions/limits for children using the intelligent personal agent application that would also add to the safety and age appropriate use of the application.

The two-way, full-motion, HD video without many of the quality issues associated with the Internet is a significant enhancement to current intelligent personal agents. It could provide an opportunity for video messages to be personalized for the party which is initiating the contact.

The personal information stored in the STB can convey many exemplary benefits such as communication preferences, alternate contact modalities, payment preferences, priority preferences, trusted contacts, personal information, as well as multimedia messaging, etc. The integration of the personal information with the intelligent personal agent also enhances the user experience.

There are several examples of what this idea can provide the user that current intelligent agents are not able to do. One is the ability to greet calling parties with a full motion video greeting unique to that calling party. Another is the ability to handle more complicated transactions. For example, the user wants to buy a particular item at a particular price from one of several preferred vendors. Offers from preferred business partners can be pushed to the MSO's users and the content can be filtered, compared with conditions set by the user for a purchase, and the intelligent personal agent can either complete the transaction or call the user on a mobile device to seek approval and then transact business. While there are shopping agents, mobility applications and contactless payment devices, this intelligent agent can provide a user experience unequaled in the current art. Another possible variation is for the intelligent personal agent to coordinate multiple parties within a household. Let's say an invitation arrives inviting a family over to dinner at the calling party's house. The intelligent agents can interact with personal information and scheduler software for all of the members of the family to make certain that the invite has considered each members previous commitments prior to replying and either accepting or modifying the proposed dinner invitation. There are numerous other variations that are possible with this intelligent personal agent not possible within the existing art.

Social network services focus on the building and verifying of online social networks for communities of people who share interests and activities, or who are interested in exploring the interests and activities of others, and that necessitates the use of software.

Most social network services are primarily web based and provide a collection of various ways for users to interact, such as chat, messaging, email, video, voice chat, file sharing, blogging, discussion groups, and so on.

The main types of social networking services are those that contain directories of some categories (such as former classmates), means to connect with friends (usually with self-description pages), and recommender systems linked to trust. Popular methods now combine many of these, with MySpace™, Bebo™ and Facebook™ services being the most widely used.

OCAP combined with personal profile information provides another venue for a social network, but offers several advantages compared with previous attempts at this type of application. One is the fact that, as discussed, STBs are equipped to handle two-way, full-motion, High Definition (HD) video. Another is the improved security discussed above. The extensibility and the interoperability that SIP adds to Packet Cable 2.0 allows the full gamut of communications modalities and devices to be leveraged. One exemplary embodiment of the social network proposed here can be one-to-one, one-to-many and many-to-one, and can cover both personal and professional interest areas.

Another exemplary aspect of this invention is the use of personalized information and personal preferences contained in a STB combined with two-way, full-motion, HD video and improved security to provide a greatly enhanced social networking experience.

The two-way, full-motion, HD video without many of the quality issues associated with the Internet is a significant enhancement to the current social networking offerings. It would provide an experience that is much more like a face-to-face interaction.

The personal information stored in the STB can convey all of the benefits listed above such as communication preferences, alternate contact modalities, payment preferences, priority preferences, trusted contacts, personal information, etc. The integration of the personal information combined with the social networking application(s) also enhances the user experience.

In addition to the normal uses of a social networking application such as on-line dating, discussion groups, virtual communities, and the like, one can imagine extensions to the use of this application. One such extension would be the addition of personal reviews of restaurants, movies, books, music, and the like. Other users of the social network could determine over time which reviewers tend to rate goods and services consistently with their interests and/or from a perspective that they enjoy their reviews, and could preview the ratings provided about items of interest by those reviewers. One could also see reviews when previewing related media. The reviewers and the users that tend to agree or become popular could go on to form their own social network based on their experience with each other's recommendations or interactions. With the extensibility of Packet Cable 2.0, a user could also provide a review of a movie that they had just viewed in a theater via their cell phone while their thoughts are fresh.

Many small businesses start out as part-time home businesses. In addition, some people run a small business focusing on rental properties, or the like, in parallel with their normal employment. Some fairly sizable businesses are run at locations served by MSO DOCSIS services. OCAP provides an opportunity to integrate business profile information into STBs similar to how personal information is integrated in a STB, as discussed in above. Further, business application software, such as the Quicken® Home and Business program or the Quicken® Rental Property Manager program can be advantageously integrated together with business information profiles in the STB.

There are many other instances where OCAP can provide an enhanced user experience to business users. Via OCAP, and with a business profile, actual inventory levels can be compared with desired levels stored as business information in the STB. Since preferred vendor and preferred payment information can also be stored, when inventory runs below a certain level, it can be automatically ordered, or alternatively, OCAP can provide a pop-up or call a specified phone number such as a mobile phone to confirm that the inventory reorder should be processed.

Another example would be management of a rental vacation property. Not only could the landlord view bookings and the like, but the ability to extend a rental stay could be offered to the guest via the TV/STB when such an opening is available. Further, an offer to return at a future date could also be made via OCAP. In this way, the renter feels that they are getting increased attention without significant intrusion, and the landlord is more likely to be able to keep the rental property at maximum capacity.

While the internet provides some of these types of features, OCAP allows for, as an example, a richer feature set, improved convenience, and the ability to leverage previously incompatible devices in a seamless way. Specifically, the ability to reorder inventory when the small business owner is mobile, and the ability to provide all of the information regarding the transaction such as vendor, inventory type and quantity, preferred payment options, and the like, without the small business owner having to key in such information, is useful. Similarly, renting vacation properties is typically done via the internet. However, not everyone takes a PC or web-enabled device everywhere with them. Offering the ability to extend a stay, rebook a future vacation, or offer incentives to good repeat guests can all be done via OCAP and displayed on a TV or forwarded as an audio message to the rental property phone.

The use of business information and business preferences contained in a STB integrated with other PC or STB-based business software can provide full compatibility with previously incompatible endpoints and improved security to provide a greatly enhanced business experience.

The fact that sensitive information about business(es) can be stored within their own STBs improves security concerns associated with web-based attacks. The disclosure or query of the business information can be established on a trust basis, which also helps with security and privacy. The push of security information, such as DCAS, also makes the environment significantly safer. One could also envision, if there are multiple users within one entity, that they can each have a profile that is login protected for privacy. In addition, one or more members of the entity can also have a business profile in the STB.

The two-way, full-motion, HD video, without many of the quality issues associated with the Internet, is also a significant enhancement to businesses. It provides, for example, an opportunity for video messages to be personalized to the guest or customer when the business owner is unavailable.

The business information stored in the STB can also convey the benefits of personal information listed above, such as communication preferences, alternate contact modalities, payment preferences, priority preferences, trusted contacts, inventory levels, business events/calendar, as well as multimedia messaging, etc. The integration of the business information combined with existing business software enhances the business owners' ability to conduct their businesses.

There are several examples of what this idea can provide to the business user that current PC based software does not allow. One is the ability to greet guests and customers with a full motion video greeting unique to each party. Another is the ability to handle more complicated transactions. For example, a vacation rental guest decides that they really like the property that they rented, but would like to consider other such properties for a future vacation prior to the end of their current vacation. Offers from the landlord can be extended to preferred guests while on their current vacation for reduced rate stays at this or other properties, to retain the guest's business. All of this can be displayed to the TV at the property, or if the TV is not used, sent via an audio message to the phone in the rental. There are numerous other variations that are possible with this business application and profile that are not possible within the existing art.

An exemplary embodiment is directed toward one or more solutions that are capable of providing feedback information about OCAP/ACAP/IMS solutions generally related to audience acceptance and satisfaction, and extensions thereto. For example, one exemplary aspect is directed toward information, such as consumer feedback about their viewing choices, being gathered, evaluated and distributed. Even more specifically, an exemplary aspect is directed toward the use of information, such as personalized or customized information and personal preferences contained in an STB combined with an OCAP/ACAP/IMS intelligent personal agent and application (s) to provide advanced interactive and interoperable services to both obtain and distribute feedback about OCAP/ACAP/IMS services.

In keeping with the design intent of OCAP/ACAP/IMS such feedback services are not possible nor are they as accessible, adaptable, extensible and commercially viable because the former can, among other things, more easily use a plethora of interfaces, products or other services.

Even more specifically, there are behavior identification possibilities with OCAP/ACAP/IMS combined with personal profiles and intelligent agent technology that are not possible with any current technologies because the later lacks access to advanced presence services, among others. These behaviors can be shopping, purchasing, travel, use of social networks, other web services and many other types of behaviors. Furthermore, IMS can provide a decentralized application control via SIP, which makes such applications more commercially viable because they can be rapidly developed, more easily tested, flexibly configured and more widely deployed. Such SIP-based applications are easier to design because they may not be concerned with tedious and mundane core functions like authentication, authorization, routing and logging. Such SIP-based applications can also be distributed among a variety of application servers, and their clients can be anywhere in the network. Security, privacy and reliability are also vastly improved because services through the STB rather than PCs, that have well-known flaws and deficiencies. The new interactive and interoperable services possible with this idea can also better interface with the prior technologies than can the prior technology solutions themselves. Because solutions created by this idea are generally, in accordance of an exemplary embodiment, Java® based, they have access to mature software architecture design techniques and design patterns for building interfaces to other services and clients.

In accordance with one exemplary embodiment, adaptors can be created to act as an intermediary between old and new services. Decorators can be available to flexibly add or remove components without necessarily changing external appearance, functions or functionality. Façade's can provide simplified interfaces to groups of subsystems or a complex subsystem. Flyweights can allow sharing of objects to reduce low-level detail that must be accounted for. Proxy's can provide a representative of an object to specifically control its access, speed and security.

One simple exemplary aspect is the use of this technology to summarize an individual's television viewing choices and to automatically post them to, for example, social networking sites such as Facebook®, Twitter®, RSS feeds, blogs, microblogs, a shared website, or in general any location (on the internet). Another simple exemplary aspect would be to aggregate, compare, and contrast the television viewing choices of a group of Facebook® friends to create other web content. Conversely, a consumer could subscribe to a service that automatically downloads television programs to their STB based on a blog that matches the consumer's interest, RSS feeds of highly rated programs, or other web content that rate or review media.

A more complex exemplary aspect is directed toward monitoring failures, due perhaps to cable outages, to record a cherished television program and automatically download it from one or more web sources. Multi-modal devices, such as iPhones, Blackberry's, or the like, could also be synchronized with a television program being viewed thereby allowing minute and detailed real-time feedback about the program or commercial being viewed. Moreover, parents can more flexibly control and regulate children's viewing habits, allowing more leeway regarding time of day, length of time viewing, chores and responsibilities like homework, psychological profiles, or the like.

The system can also use automatic speech recognition (ASR) to detect, among other things, yelling and screaming proximate to the STB, laughter, or the like, to deduce a viewer's response to specific content. Furthermore, rating agencies can automatically poll viewers for additional information at strategic moments based on real-time data being gathered on the viewer and the content being provided. Passive, automatic, and biometrically-based audience preferences and responses can be automatically distributed to one or more rating agencies via, for example, a network connection, the internet, or the like.

In accordance with yet another exemplary aspect, galvanic skin response, heartbeat, breathing rate, and in general any biometric information can be associated with a variety of psychological states, such as tension, for example, that would be of interest to content providers. Another example is eye dilation, associated with an increase in interest, could provide rating agencies with a viewer's, perhaps unconscious, response. Eye movements can also be monitored, traced, recorded, and analyzed with the cooperation of a camera, to reveal what is of specific interest to a viewer. Even more exotic noninvasive means of determining a viewer's state of mind can be envisioned by those schooled in the use of functional magnetic resonance imaging (fMRI), nuclear resonance medical imaging (nMRI) or the like. Use of these exotic means of feedback is more easily, privately, securely, widely distributed, and interfaceable to devices using OCAP/ACAP/IMS services.

In accordance with yet another exemplary aspect, another solution is directed toward the preferences and ratings that are of benefit to the MSO, their business partners, content providers, regulators, investors or the like, which are enabled by the specific architecture disclosed herein. One simple example, among many, is found in issues related to STB performance (e.g., peak CPU usage), bandwidth usage, service outages or interruptions, or the like. Such can be provided to technical support, regulators, business partners, third-party service providers, suppliers or the like based on one or more criteria, choices, ratings, or the like, chosen by any one or more of these third-parties, or even made jointly by them using methods, attributes or the like, chosen according to their joint specification.

One simple example is associated with a well-known cable provider. This cable provider has one of the worst consumer satisfaction ratings on record, and has disappointed not only consumers but also regulators, among others. Although this cable provider has now published byte limits for consumer downloads, their policy regarding bandwidth availability remains opaque. This cable provider has been accused, perhaps apocryphally, of arbitrarily restricting high-definition television bandwidth for some of its channels to conserve overall bandwidth usage. Such practices could be of special interest to the content providers for those channels or groups of channels. Therefore, one exemplary technique disclosed herein permits content providers and others to rank channels in importance thereby allowing a cable provider to restrict bandwidth in ways that are mutually agreeable among all affected and interested parties.

Another exemplary embodiment is directed toward the use of personalized information and business preferences contained in an STB combined with an OCAP/ACAP/IMS intelligent personal agent application to provide advanced interactive and interoperable services to both obtain and distribute feedback about such OCAP/ACAP/IMS services.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

Figure 1:
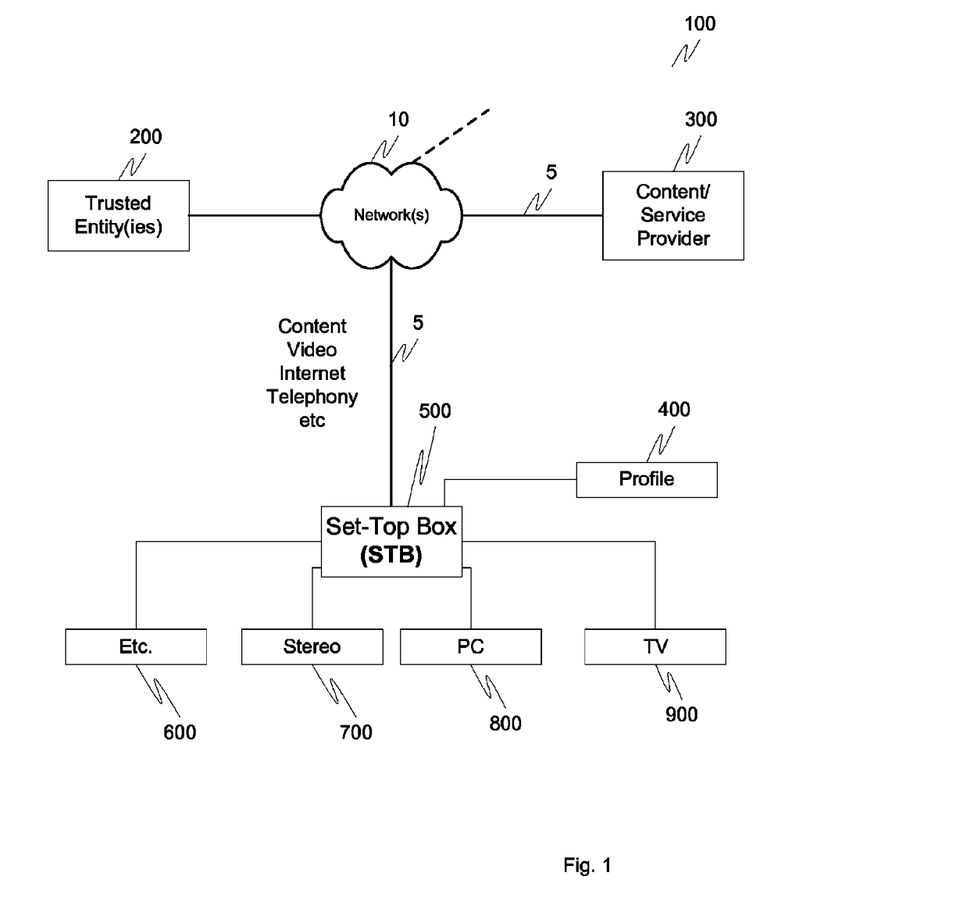
FIG. 1 illustrates an exemplary content system.

FIG. 1 illustrates an exemplary content system 100. The content system 100 comprises one or more trusted entities 200, one or more content/service providers 300, such as a cable company, and a set-top box 500, all interconnected by one or more links 5 and networks 10. The set-top box 500 is connected to one or more of a stereo 700, PC 800, TV 900, or in general any electronic device as represented by box 600. Associated with the set-top box 500 are one or more profiles 400, as will be discussed in detail hereinafter.

In general, the set-top box 500 is capable of receiving content, such as video content, as well as providing services such as access to the internet, telephony services, and the like. As will be discussed hereinafter, the set-top box 500 is also capable of providing services such that, for example, the user located at one of the attached devices utilizes the set-top box 500 to assist with the ordering, consumption and/or management of the service.

Typically, the content/service provider 300 provides content, such a video content, to a user via the set-top box 500. An exemplary embodiment of the present invention expands on this concept and in conjunction with profile 400 provides enhanced content capabilities and interactive and interoperable services through the set-top box 500.

Furthermore, and in accordance with an optional exemplary embodiment, trusted relationships can be established between the content/service provider 300 and one or more trusted entities 200. For example, the content/service provider 300, such as a cable company, can negotiate trusted relationships with various service providing entities. Upon the completion of various checks and assurances from the service providing entities, the various entities could be listed as a trusted entity 200, at which point service requests made via set-top box 500, in conjunction with profile 400, could be handled in a different manner.

The association of the profile 400 with the set-top box 500 allows, for example, a richer communications environment to be provided to a user. For example, a customer at their home calls into a customer service number. Instead of the call being rerouted from center to center based on information the customer inputs via the phone, the call can use a common customer routing center. The routing center, which could be one of the trusted entities 200, can use the phone number to look-up a key set-top box entry for the customer, and the center can then electronically retrieving the stored service information entry via the set-top box 500, from the profile 400. The information retrieved from the profile 400 can be combined with the caller's requested service, routed to the appropriate agent with the information retrieved from the customer STB (relieving the need to interrogate other databases or the user and making for more efficient contact centers), and additional information for the customer can be displayed on, for example, the TV 900 or PC 800 associated with the set-top box 500.

In another example, the customer can initiate a service transaction on the set-top box 500 itself. For example, a menu based request can use stored service information in the profile 400 to key a web service request. If the question triggers a human response, like that from a retention agent when service cancellation is requested, the set-top box information can key to the customer phone for an outbound call to confirm the cancellation request and allow for a retention offer to be made.

Therefore, in accordance with one exemplary embodiment, the profile 400 can be used, for example, to assist with contacts to a contact center and can be utilized in conjunction with the set-top box 500 to provide a service to, for example, other retailers, service outfits, and trusted or other entities. The set-top box 500 can also store customer service records specific to, for example, an individual or a business, as discussed above. The same method used to assist with a customer service contact as discussed above could similarly be used to access records or other information stored in the profile 400 to assist with business services, business management, online banking, or the like.

For example, the same mechanisms can be used to push structured information and menu information for the requested transaction, inquiry, or service request, thereby providing a richer customer service experience. This richer experience combined with the ease of retrieval of customer service information, personal information and/or business information from the profile 400 provides, for example, a significantly richer customer contact capability than that which can be offered by traditional centers. This in turn gives an opportunity for new large business service opportunities for the contact/service provider 300.

In accordance with an exemplary embodiment, the profile 400 used in conjunction with one or more applications on the set-top box 500 provides a richer experience for a user of the set-top box for interacting with one or more content/service providers, trusted entities, other entities, or in general any entity that may be able to provide a richer customer experience based on the information available to them via the profile 400.

Figure 2:
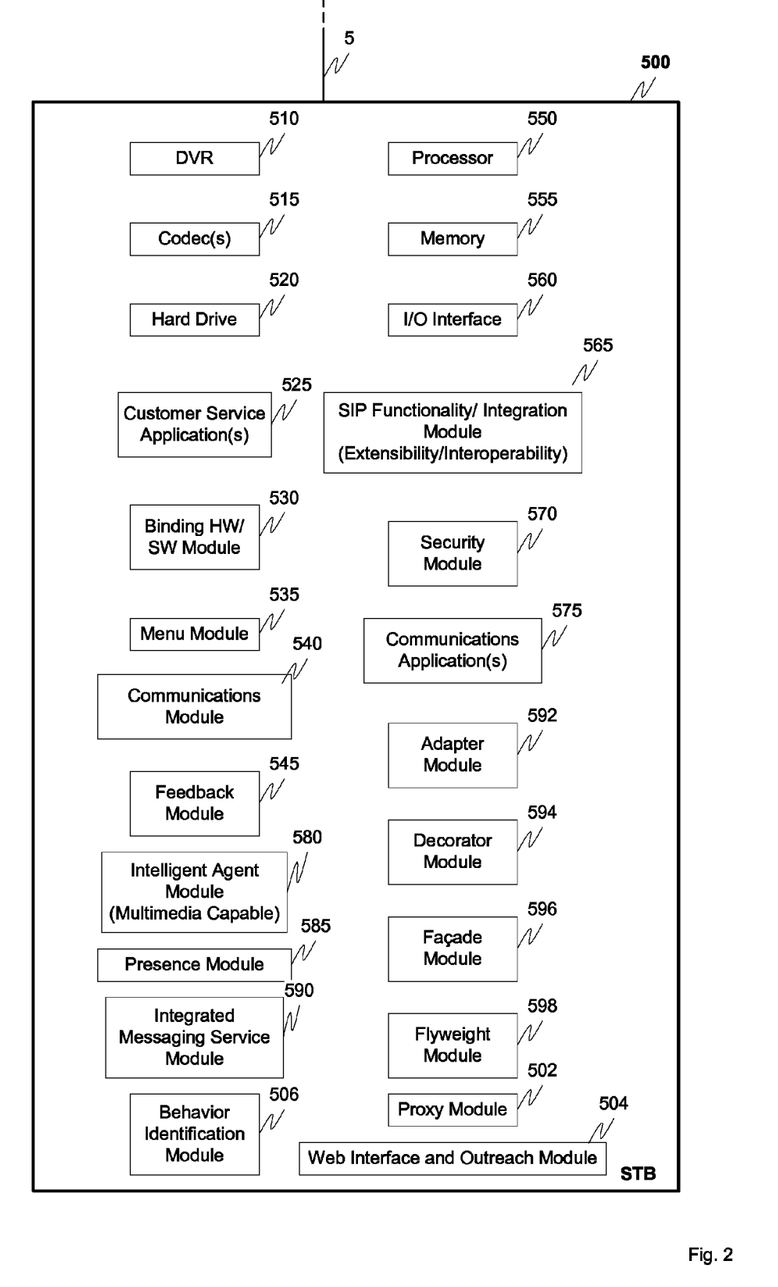
FIG. 2 illustrates an exemplary set-top box.

FIG. 2 outlines in greater detail an exemplary STB 500. In particular, the STB 500 includes optional DVR 510, one or more codec(s) 515, hard drive 520, one or more customer service applications 525, a hardware/software binding module 530, a menu module 535, a communications module 540, feedback module 545, processor 550, memory 555, I/O interface 560, SIP functionality/integration module 565, security module 570, communications applications 575, intelligent agent module 580, presence module 585, integrated messaging service module 590, adaptor module 592, decorator module 594, façade module 596, flyweight module 598, proxy module 502, web interface and outreach module 504, and behavior identification module 506.

In accordance with the first exemplary embodiment, the set-top box 500 is intergratable with one or more social networking sites, RSS feeds, or other internet locations. For example, and in cooperation with the web interface and outreach module 504, intelligent agent module 580, hard drive 520, processor 550, memory 555 and I/O interface 560, viewer choices are tracked. These viewer choices can be agnostic to the actual user utilizing the set-top box 500 or, for example, can be specific to a particular user, such as the example where a user logs on to the set-top box 500, thereby invoking a profile stored in profile 400, thereby making their viewing choices user-specific. Their viewing choices can be tracked and stored, for example in hard drive 520, and, for example, based on one or more rules uploaded to one or more destinations. As an example, say a particular user stores in their profile that they would like to post their viewing choices to a particular social networking site, along with supplemental information such as when they watched the particular content, as well as any commentary they may have regarding the viewed content. Set-top box 500 cooperating with the menu module 535 and web interface and outreach module 504 can automatically post this information to an internet destination(s) as well as provide the user the ability to supplement the posted information with information such as notes, comments, or the like. Web interface and outreach module 504, cooperating with the profile module obtains the necessary user IDs, passwords, log-in credentials, and the like, and then posts this information to a particular internet destination. As will be appreciated, this internet destination can be specified in, for example, profile 400 which could also include preferences as to formatting, frequency of posting, and in general maintain any characteristic, or aspect of how, when and where the information should be posted.

In accordance with another exemplary embodiment, the set-top box 500 ability to interface with web content is expanded to include the ability to aggregate, compare and contrast television viewing choices with a group of friends, to one or more of create other web content, and/or trigger one or more events. For example, and again in cooperation with profile 400, a user can identify one or more groups that are to be tracked. The set-top box 500 is then optionally capable of coordinating with the other set-top boxes associated with other viewers within the group, optionally in cooperation with a server or other internet resource, such that the viewing choices of the members within the group can be tracked. Again, this can be regulated by one or more rules within the profile 400 that can optionally filter the system's ability to track some viewing choices, but not others. One or more of the intelligent agent module 580, or another server (not shown), can then one or more of aggregate, compare, and contrast the viewing choices of the members within the group and one or more of develop content and recommendations based thereon. For example, if numerous members of the group are watching a particular series of shows, this information could be communicated, with the cooperation of communications module 540, to the other users in the group who do not appear to be watching the same content. In an even more dynamic application, and in cooperation with presence module 585, if all but one member of the group is watching a particular show, the presence module 585 determines that the member of the group not watching the show is home, but not tuned in, the presence module 585 can cooperate with the communications module 540 to, for example, notify the user that all of the other members of the group are watching a particular show, and they may want to tune in. The set-top box 500 could then, for example, automatically tune to or begin recording the particular show that appears to be of interest.

As another example, the integrated messaging service module 590, optionally cooperating with the hardware/software binding module 530 and profile 400, could generate and send a message to, for example, the user's mobile communication device communicating that the other members of the group are watching a particular show that is currently being aired. The user could then be provided the option of having the set-top box 500 automatically stream, with the cooperation of one or more communications applications 575, the particular show to the user's mobile communication device.

In accordance with another exemplary embodiment, deviating from the traditional TV Guide-type of approach to determining which content to watch, a user, in cooperation with the intelligent agent module 580, can subscribe to one or more blogs, RSS feeds, or other internet resources, with one or more of these resources providing, for example, recommendations for highly rated programs, or other content, that should be viewed. The set-top box 500, cooperating with the intelligent agent module 580, DVR 510, and the web interface and outreach module 504, could then automatically download the one or more recommended shows and save them for viewing by the user. As with the other embodiments described herein, one or more rules, stored in the profile 400, could optionally be overlaid on top of this functionality to filter or otherwise regulate the content being downloaded to the STB 500.

In accordance with another exemplary embodiment, one or more customer service applications 525 running on the set-top box 500 can monitor one or more of set-top box failures, quality of the received signal, and quality of one or more stored programs. This information can then be utilized by the set-top box to assist with, for example, ensuring content requested by the user is available to that user in its entirety, and at a specific or better quality metric.

For example, if during the recording of a particular show, noise interfered with the recording of that show thereby creating static for 7 minutes of the recorded program. Customer service application 525 can detect this static, and automatically commence re-downloading of the show when it is determined, for example, that the communication channel has been cleared up. The customer service application 525 can coordinate the re-downloading of this content with the service provider, the service provider having the option of directing the customer service application 525 to, for example, one or more other sources where the content may be available at a better quality. This can also be extended to cover the situation where perhaps failures, cable outages, noise, and the like, was not a problem, but perhaps the downloaded content was only available at 480$i$, yet the user requested all downloaded content be stored at 1080$p$. Customer service applications 525, again cooperating with profile 400, and quality metrics stored therein, can optionally automatically and dynamically reach out to one or more content providers to ensure content, in the proper format, is obtained for viewing by the user.

In accordance with another exemplary embodiment, other devices such as multi-modal devices, such as iPhones, Blackberry's, or the like, can be in communication with the set-top box 500, for example, wirelessly, via Bluetooth®, or in general any communications modality, with the multi-modal device capable of being synchronized with the set-top box 500 and one or more television programs being viewed. This can allow, for example, minute and detailed real-time feedback about the program, or even commercial, being viewed to be obtained. More specifically, the communications module 540, optionally cooperating with the SIP functionality/integration module 565 and information stored in profile 400, and optionally in cooperation with presence module 585, can detect when a viewer is viewing a particular program, and whether or not they have their multi-modal communication device available. If the presence module 585 determines that the multi-modal communication device is available to the user, this information can be used, for example, by one or more customer service applications and a content provider to commence providing information to that communications device. The information can be sent to the communications device via the set-top box 500 and in cooperation with one or more of the communications module 540 and communications applications 575, with the set-top box 500 acting, for example, as an access point for the communications device, and/or the information communicated to the communications device via traditional techniques.

In accordance with this exemplary embodiment, the communications device provides another modality on to which a content provider could provide additional content, polls, questions, advertising, or in general any information, that may or may not be related to, for example, the program the user is currently watching. This could be particularly advantageous if, for example, a service provider would like to solicit particular feedback from a user, and for example, an elegant input device is not currently associated with the set-top box. For example, and based on information in profile 400, the content provider could determine that the user has a qwerty-style keyboard associated with their communications device, the presence module 585 has determined that the communications device is with the user and the user is watching a particular program. With this information, a service provider could, for example, assemble and forward user-specific questions which then could be answered using the QWERTY keyboard on the mobile communications device by the user. With this information being returned, for example with the cooperation of one or more of the SIP functionality/integration module 565, customer service applications 525, communications module 540, and communications application 575 to the content provider. This synchronization functionality could be extended to allow, for example, the multi-modal device to act as an input device to the set-top box 500 in cooperation with the communications module 540 and communications application 575.

For example, the multi-modal device could be equipped with one or more applications that allow the multi-modal device to control the functionality of the set-top box, as well as allow input received, for example from the keyboard, to be provided to the set-top box 500. Extending this functionality even further, and in that many multi-modal devices include cameras, microphones, video cameras, and the like, all the information obtained from these various sources could also be shared with the set-top box 500 and, for example, stored, forwarded to another destination, or the like. In accordance with one exemplary embodiment, any feedback or information received from the multimodal device can be utilized by one or more of regulators, business partners, third-party service providers, suppliers, content providers, or the like to, for example, assist with providing better customer satisfaction.

In accordance with another exemplary embodiment, the set-top box can be equipped with a microphone and/or video camera (not shown) that are capable of detecting speech and such things as yelling, screaming, laughter, alone or in combination with automatic speech recognition of speech to deduce a viewer's response to specific content. All of these response-type actions can be monitored by the set-top box 500, and in cooperation with the customer service application 525, provided to one or more entities to track the viewer's reactions. Moreover, the intelligent agent module 580 can cooperate with an automatic speech recognition engine to monitor for certain words and/or key phrases that can be used to also provide a better customer service experience. For example, if an automatic speech engine detects one of the viewer's saying "What did she say?" the intelligent agent module 580 can, for example, rewind the program 30 seconds and turn up the volume to assist with improving the user's customer experience. In general, this functionality can be expanded such that a user is also capable of utilizing verbal commands to control one or more functions associated with the set-top box 500, as well as using verbal commands as input to, or responses to, questions, polls, or the like, provided by a service provider to the set-top box 500.

As yet another example, rating agencies can automatically poll viewers for additional information at strategic moments based on real-time data being gathered on the viewer and the content being provided. Even more specifically, and in cooperation with one or more of communications applications 575, web interface and outreach module 504, processor 550, memory 555, I/O interface 560, hard drive 520 and menu module 535, one or more polls can be provided by the set-top box 500 on, for example, an associated device such as TV, personal computer, or the like, or as discussed previously, provided to a communications device associated with the user. The user could then use, for example, their remote control, communications device, or the like, to provide feedback to the targeted polling with the responses thereto being returned, with the cooperation of the communications applications 575 and communications module 540, to for example, a content provider, regulator, business partner, third-party service provider, suppliers, or the like.

In accordance with another exemplary embodiment, one or more of passive, automatic and biometrically-based audience preferences and responses can be automatically distributed to rating agencies via the web with the cooperation of the web interface and outreach module 504. As discussed, any type of biometric can be monitored in cooperation with an associated biometric monitoring device (not shown) to one or more of monitor, trace, record, and analyze one or more biometric events associated with one or more viewers of content being provided by the set-top box 500. This information can be harvested and, for example, distributed to one or more entities, such as content providers, third-parties, suppliers or the like, with the cooperation of the communications applications 575 and associated communications hardware.

In accordance with yet another exemplary embodiment, and again in cooperation with customer service application 525, communication application 575, communications module 540, processor 550, memory 555, I/O interface 560 and hard drive 520, one or more performance metrics associated with the set-top box 500 are monitored. These performance metrics are compared against, for example, various thresholds with information as to whether the performance metrics have been met being provided to one or more of technical support teams, regulators, business partners, third parties, suppliers or the like. Additionally, these performance metrics can be provided to the intelligent agent module 580, as discussed above, to assist with insuring the user is being provided with the quality of content and format of content they have specified in their profile.

In accordance with yet another exemplary embodiment, the behavior identification module 506, optionally cooperating with presence module 585, is capable of tracking one or more of shopping, purchasing, travel, social network web site visits, web services, or the like, being utilized by the user of the set-top box 500. These various behaviors may be of interest to one or more of the content providers, third-party service providers, or the like and can be monitored in a similar manner to the other monitored events and behaviors discussed herein.

Figure 3:
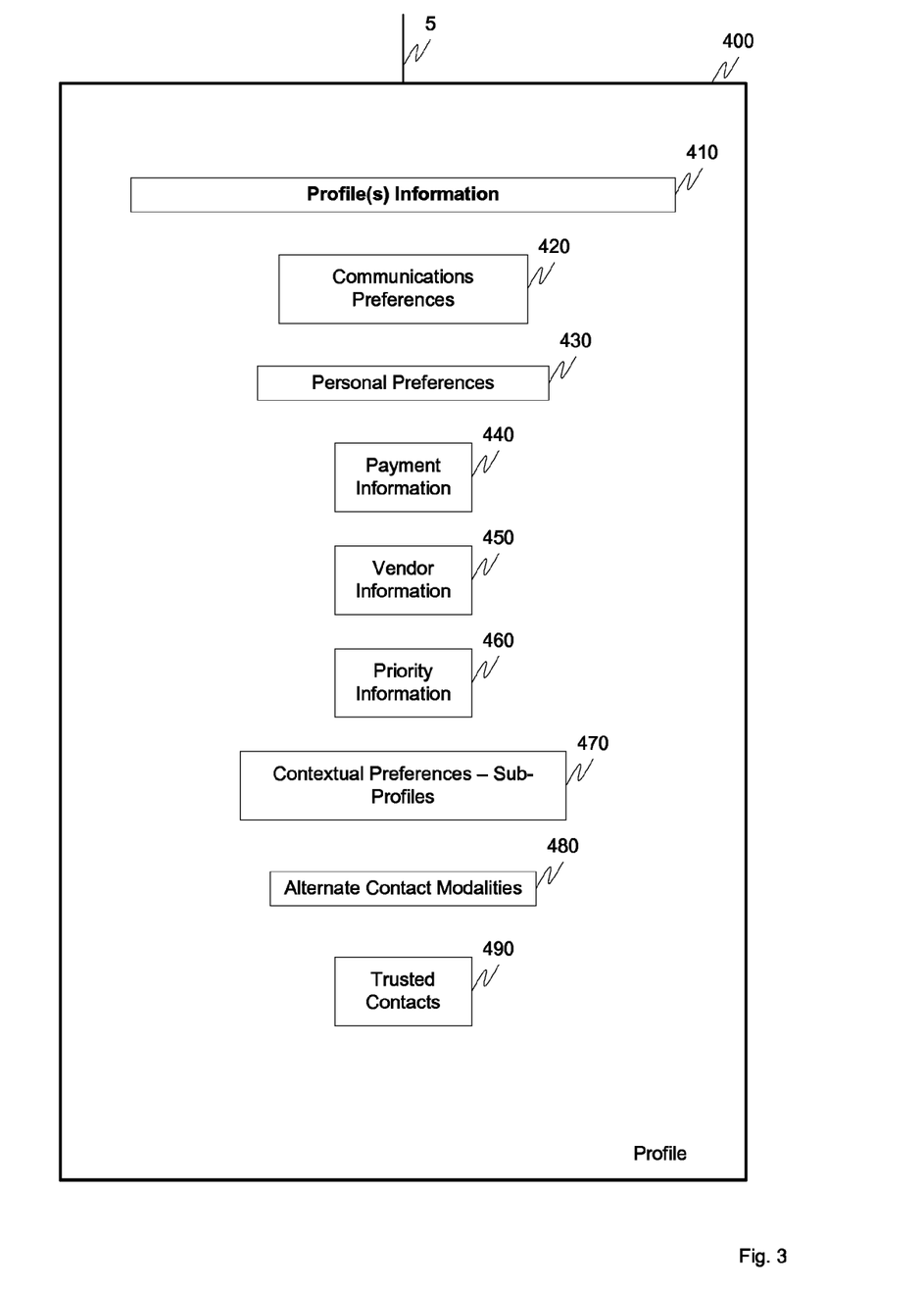
FIG. 3 illustrates an exemplary profile.

FIG. 3 outlines an exemplary profile 400. The exemplary profile 400 comprises one or more of business, personal, and entity information 410, communications preferences 420, personal preferences 430, payment information 440, vendor information 450, priority information 460, contextual preferences and sub-profiles 470, alternate contact modalities 480 and one or more trusted contacts 490.

As discussed, one or more of the personal, business and entity information can include any information that a user would like to store. For example, examples of personal information include name, address, credit card information, banking information, movie preferences, communications preferences, restaurant preferences, vendor preferences, billing preferences, and the like. Examples of business information includes, for example, preferred vendors, banking information, communications preferences, ordering or inventory information, employee information, payment information, accounting information, business management information, or in general any information related to a business. Entities can also include information about items such as groups of individuals, groups of businesses, or in general any entity that may not be personal or business in nature. Interfaces that can be provided that provide access to the information stored within the profile, and this information can be edited, updated or deleted as appropriate. The editing, updating or deleting of this information can be performed via an interface on the set-top box, or via any interface connected to the set-top box. This access to the information within the profile can be password protected, and the information can be transferred via or in accordance with well known encryption techniques and standards.

The communications preferences 420 provide to the user the ability to store various types of communications preferences or modalities that can affect not only the type of communication to use to access the user, e.g., video, chat, IM, telephone, or the like, but that can also be used in conjunction with presence information and/or communication routing.

The personal preferences 430 are a set of rules related to a particular user's personal preferences. These personal preferences can relate to any functionality of the set-top box, display characteristics of the STB, operation of the STB, or the like, and can be related to any one or more of menu options, communications preferences, contact preferences, set-top box management, or the like.

Vendor information 450 stores various information that can be used for the payment of goods and/or services ordered through or in conjunction with the set-top box 500. This payment information can have a higher security level than other types of information within the profile 400, such that, for example, a password is required before the purchase for goods and services can be made. Additionally, the payment information could be limited to use by the contact/service provider 300.

Vendor information 450 can include such information as preferred vendors, vendors who should not be used, historical purchase information, account information, reference information associated with a particular vendor, or in general any information associated with a vendor. When new vendors are utilized, and in conjunction with the intelligent agent module 580, new information can be added to the vendor information 450 and stored in the profile 400.

In addition, also in conjunction with the intelligent agent module 580, the vendor information 450 can be dynamic such that as, for example, a user accesses a particular vendor's website, account information can be populated into the vendor information 450 such as order placed, remaining balance, special offerings, or in general any information associated with that particular vendor.

Priority information 460 includes any information, such as rules, that can be used to assist with prioritizing certain activities, applications, or in general, any functionality associated with the set-top box 500. This priority information 460 could also be used in conjunction with the intelligent agent module 580 to assist with determining prioritization of certain activities.

The contextual preferences and sub-profiles 470 establishes preferences based on context that could also be categorized as sub-profiles depended upon, for example, a particular application being run on the set-top box 500. As with the other types of information, the contextual preferences 470 can be used in conjunction with the intelligent agent module 580 to provide dynamic application behavior.

The alternate contact modalities 480 outline various contact modalities for a particular user. These alternate contact modalities 480 can be used with the communication preference information, personal preference information and/or priority information to assist with completion of an incoming communication to an endpoint. For example, based on information in the alternate contact modalities profile, one or more of the binding module and SIP functionality module can be utilized to complete an incoming communication to an endpoint where the user is located or to a device associated with the user.

Trusted contacts 490 include information regarding one or more entities that are trusted. For example, an entity can be trusted if it is approved by the content/service provider 300. Additionally, an entity can be trusted if, for example, the user has had previous interactions with the entity and has identified them it as being trusted.

Optionally, the intelligent module 580 can also be used to analyze transactions with a particular entity, and upon, for example, a threshold number of transactions being completed in a satisfactory manner, the entity can be identified as "trusted."

The trusted entities need not be limited to businesses that sell goods and/or services, but can also include entities such as schools, other individuals, or in general any one or any entity that is identified as being trusted. For example, in a social networking environment, parents can establish rules that can identify certain chat groups or other users that are trusted. In conjunction with the intelligent module, for example, a child can request a parent to approve a specific entity as trusted, and communications with that entity are restricted until it is approved by that parent.

Trusted status can also be achieved by, for example, the intelligent agent module 580 analyzing an entity's, user's or merchant's feedback. Upon a merchant having reached a threshold level of feedback, the agent can identify the merchant as "trusted" which could then, optionally, forward the "trusted" identification to an additional entity, such as a parent, for final approval.

Figure 4:
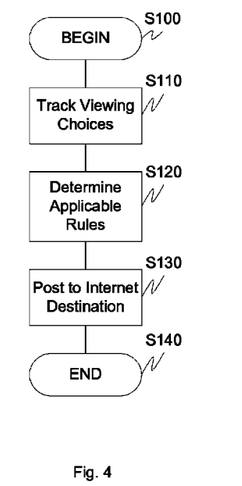
FIG. 4 is a flowchart outlining an exemplary method for tracking viewer choices.

FIG. 4 is a flowchart outlining an exemplary method of operation of the set-top box 500. In particular, control begins in step S100 and continues to step S110. In step S110, the viewing habits of one or more viewers can be tracked. Next, in step S120, one or more rules can be applied that filter the recorded viewing habits. Then, in step S130, one or more of the viewing habits can be posted to, for example, one or more internet destinations in conjunction with an associated log-in and posting application associated with the set-top box 500. As discussed, the set-top box 500 can include information as to where the viewing habits are to be posted, with this optionally being dynamically determined, based, for example, on the type of viewed content. For example, if the viewing habits are for specific science and nature shows, these viewing habits could be posted to a first internet destination. Alternatively, if the viewer has been watching car races, this could be posted to a second internet resource. Moreover, optionally in conjunction with posting the viewing habits, the user can optionally supplement this information with their own comments as well as with information that is obtainable by the set-top box, such as when the viewer watched it, how many times they watched in, and in general can include any information about the viewing habit. Control then continues to step S140 where the control sequence ends.

Figure 5:
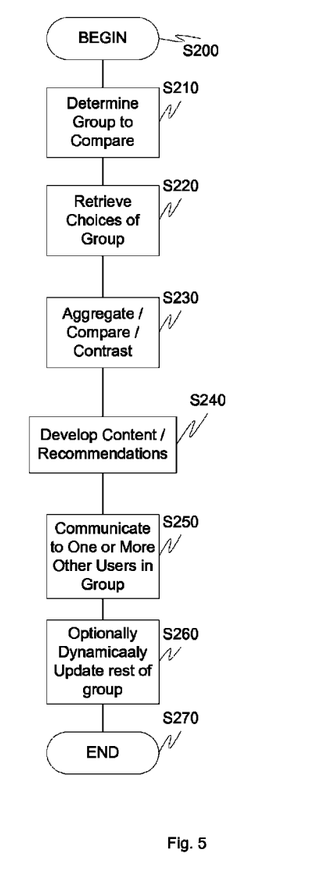
FIG. 5 is a flowchart illustrating an exemplary method for developing content recommendations.

FIG. 5 is a flowchart outlining an exemplary method for sharing information amongst a group. In particular, control begins in step S200 and continues to step S210. In step S210, a group is one or more of created and selected for which the various comparisons discussed herein are to be performed against. Next, in step S220, the viewing choices of the various members of the group can be accumulated. Then, in step S230, the viewing choices of the group can be aggregated, compared, contrasted with one or more members of the group, and optionally with one or more other groups. Control then continues to step S240.

In step S240, one or more of content and recommendations can be formulated based on the aggregation, comparison, contrasting and analysis performed in S230. As an example, a website could be updated that shows, for example, statistics associated with the various members of the group. In addition, the website could be updated indicating that most members of the group liked a particular show, but did not like another show and on this basis a recommendation provided to watch the first show. Control then continues to step S250.

In step S250, and more particularly, if a recommendation is developed, this can be communicated to one or more users in the group. This communication could be done, for example, by providing recommended viewings for the user to watch, with the STB optionally automatically capable of having downloaded those particular programs for viewing by the user. Another optional embodiment, and in step S260, one or more members of the group can be dynamically notified of actions being taken by other members of the group. These updates can be provided automatically and can be optionally provided dynamically in real-time to, for example, an internet location. As with some of the other exemplary embodiments discussed herein, this dynamic updating and intercommunication among the various users within the group can be supplemented with comments, notes, or other content provided by one or more of the users. Control then continues to step S270 where the control sequence ends.

Figure 6:
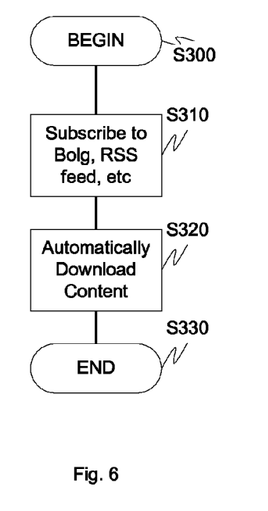
FIG. 6 is a flowchart illustrating an exemplary method for downloading content based on a feed.

FIG. 6 is a flowchart outlining an exemplary embodiment for providing content through the set-top box. In particular, control begins in step S300 and continues to step S310. In step S310, the user subscribes to one or more of blogs, RSS feeds, internet channels, or the like. Next, in step S320, optionally governed by one or more rules and user preferences, content associated with one or more of the subscribed information sources are automatically downloaded to the set-top box 500 which can then be viewed by the user at any point in time. Control then continues to step S330 where the control sequence ends.

Figure 7:
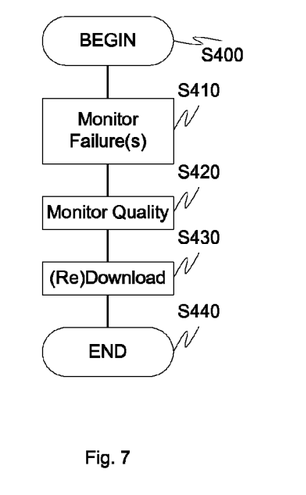
FIG. 7 is a flowchart illustrating an exemplary method for monitoring quality.

FIG. 7 is a flowchart outlining an exemplary method of monitoring set-top box performance. In particular, control begins in step S400 and continues to step S410. In step S410, the set-top box 500 is monitored for one or more failures. Next, and optionally in step S420, one or more quality metrics associated with downloaded or received content can also be monitored. Then, in step S430, a determination made whether content should be (Re)downloaded to insure that quality metrics are met. As an option, this failure or lack of quality metric criteria, can be forwarded to one or more destinations, such as a service provider, and can optionally be logged by the set-top box 500. Control then continues to step S440 where the control sequence ends.

Figure 8:
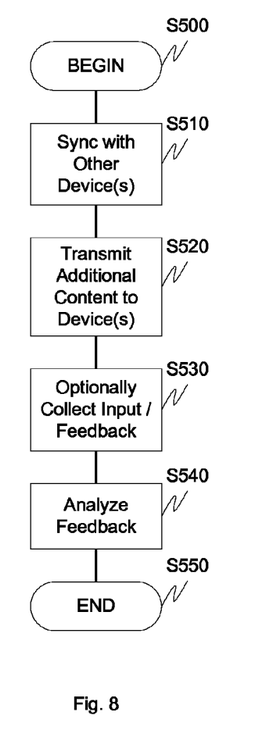
FIG. 8 is a flowchart illustrating an exemplary method for syncing with one or more other devices.

FIG. 8 is a flowchart outlining an exemplary method for harvesting information from a user. In particular, control begins in step S500 and continues to step S510. In step S510, the set-top box 500, and content thereon, is synchronized with one or more other devices, such as a multi-modal telecommunications device. Next, in step S520, additional content can be forwarded and/or transmitted to the one or more synchronized devices. Then, in step S530, feedback and/or input can optionally be solicited and/or collected from the user associated with the communications device, which can be harvested and forwarded to one or more destinations. Control then continues to step S540.

In step S540, the harvested information and/or feedback can be analyzed with control continuing to step S550, where the control sequence ends.

Figure 9:
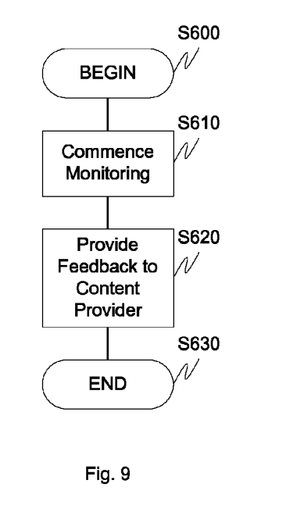
FIG. 9 is a flowchart illustrating an exemplary method for providing feedback to a content provider.

FIG. 9 is a flowchart outlining an exemplary method for monitoring viewer's reactions. In particular, control begins in step S600 and continues to step S610. In step S610, monitoring commences to one or more of automatic speech recognition, yelling, screaming, laughter, talking, or the like, being utilized to provide feedback to a content provider in step S620. This feedback can include volume information, identity information, to the extent available such as being able to distinguish between a male voice, a female voice, and multiple parties in proximity to the set-top box 500, and in general can be directed toward any characteristic, quality or trait of the monitored information. Control then continues to step S630 where the control sequence ends.

Figure 10:
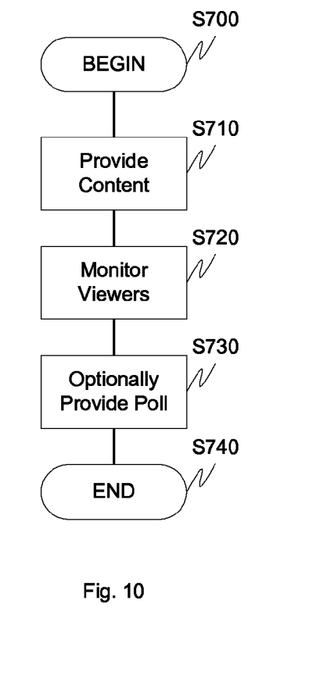
FIG. 10 is a flowchart illustrating an exemplary method for monitoring viewers.

FIG. 10 is a flowchart outlining an exemplary method for polling viewers. In particular, control begins in step S700 and continues to step S710. In step S710, content is provided to one or more viewers. Next, in step S720, viewers are monitored within step S730 polling information provided at, for example, specifically targeted points within a program. The responses to these polls can then be accumulated and forwarded to one or more destinations, with control continuing to step S740 where the control sequence ends.

Figure 11:
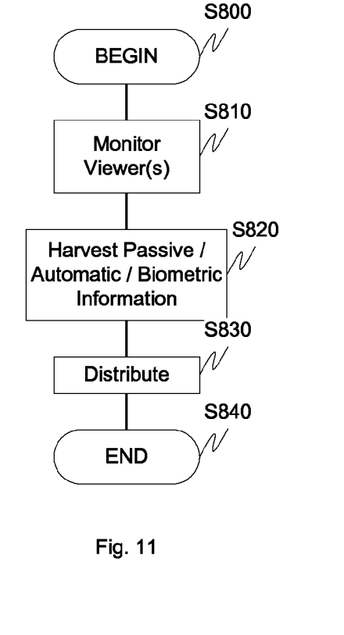
FIG. 11 is a flowchart illustrating an exemplary method for monitoring biometric information.

FIG. 11 is a flowchart outlining an exemplary method for monitoring viewer behaviors with control beginning in step S800. Next, in step S810, one or more viewers are monitored for one or more of passive, automatic, biometric, or other responses. Then, in step S820, the results of this monitoring are harvested within step S830 the results distributed to one or more destinations. Control then continues to step S840 where the control sequence ends.

Figure 12:
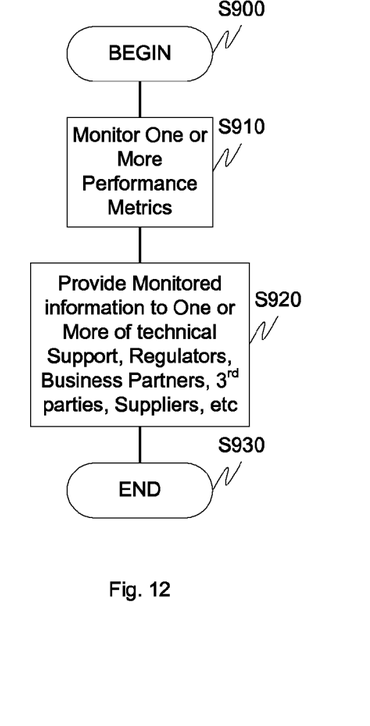
FIG. 12 is a flowchart illustrating an exemplary method for monitoring performance metrics.

FIG. 12 is a flowchart outlining an exemplary method for monitoring set-top box performance. In particular, control begins in step S900 and continues to step S910. In step S910, one or more performance metrics, quality metrics, or other metrics are monitored. Next, in step S920, the one or more monitored metrics can be provided to one or more of technical support, regulators, business partners, third parties, suppliers, or in general to any destination as appropriate. As discussed, these metrics can be used by one or more of the above parties, and can also be utilized by the set-top box to trigger certain activities, such as re-downloading of content, that did not meet certain quality and/or performance metrics. Control then continues to step S930 where the control sequence ends.

A number of variations and modifications of the invention can be used. It would be possible to provide for some features of the invention without providing others.

The exemplary systems and methods of this invention have been described in relation to STB's and profile(s). However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated, certain components of the system can be located remotely, at distant portions of a distributed network 10, such as a LAN, cable network, and/or the Internet, or within a dedicated system. Thus, it should be appreciated, that the components of the system can be combined in to one or more devices, such as a STB, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, in one or more communications devices, at one or more users' premises, or some combination thereof. Similarly, one or more functional portions of the system could be distributed between a communications device(s), such as a STB, and an associated computing device. The one or more functional portions of the system could be also be installed in a TV or TV tuner card, such as those installed in a computer.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a non-transitory storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method to operate a set-top box comprising:
    managing one or more preferences stored in one or more profiles, each profile of the one or more profiles including personal information and personal preferences, one or more of the personal information and personal preferences being used in association with a service application or a communications application for operation of the service application or the communications application;
    interfacing with one or more internet destinations, the one or more internet destinations including one or more of a social networking site, a blog, an RSS feed and a shared website to one or more of determine content for viewing and suggesting content for viewing;
    displaying the content to a viewer;
    detecting a word or phrase spoken by the viewer in response to viewing the content; and
    in response to detecting the word or phrase, rewinding the content and adjusting a volume of the content.

2. The method of claim 1, wherein the internet destinations are the social networking site or the blog and further comprising automatically downloading the content based on information posted at the social networking site or the blog.

3. The method of claim 1, further comprising monitoring viewing choices and posting a portion of the viewing choices to one or more of the social networking site, the blog, the RSS feed, the shared website and an internet destination.

4. The method of claim 1, further comprising providing a poll to one or more viewers.

5. The method of claim 1, further comprising harvesting biometric information from one or more viewers.

6. The method of claim 1, further comprising monitoring the quality of the content, and, if the content quality is below a certain threshold, downloading another version of the content.

7. The method of claim 1, further comprising synchronizing the set-top box with one or more other devices and transmitting the content to the one or more other devices.

8. The method of claim 1, further comprising monitoring one or more performance metrics and providing results of the monitoring to one or more of technical support, regulators, business partners, third parties and suppliers.

9. A non-transitory computer readable information storage media having stored thereon instructions, that if executed by a processor, perform the steps of claim 1.

10. The method of claim 1, further comprising the steps of:
    determining or integrating information about a group to compare viewing choices of the group, wherein viewers within the group have individual set-top boxes;
    coordinating with the individual set-top boxes to track the viewing choices of the group; and
    developing content recommendations based on viewing choices of the group, wherein the content recommendations comprise making a recommendation to a specific group member.

11. A set-top box comprising:
    one or more profiles that store and manage one or more preferences, each profile of the one or more profiles including personal information and personal preferences, one or more of the personal information and personal preferences being used in association with a service application or a communications application for operation of the service application or the communications application;
    a web interface and outreach module that interfaces with one or more internet destinations, the one or more internet destinations including one or more of a social networking site, a blog, an RSS feed and a shared website to one or more of determine content for viewing and suggest content for viewing; and
    the set-top box operable to send the content to a display to be viewed by a viewer, detect a word or phrase spoken by the viewer in response to viewing the content, and, in response to detecting the word or phrase, rewind the content and adjust a volume of the content.

12. The set-top box of claim 11, wherein the internet destinations are the social networking site or the blog and further comprising an intelligent agent module that automatically downloads the content based on information posted at the social networking site or the blog.

13. The set-top box of claim 11, wherein viewing choices are monitored and a portion thereof posted to one or more of the social networking site, the blog, the RSS feed, the shared website and an internet destination.

14. The set-top box of claim 11, further comprising an intelligent agent that provides a poll to one or more viewers.

15. The set-top box of claim 11, further comprising a behavior identification module that harvests biometric information from one or more viewers.

16. The set-top box of claim 11, further comprising a customer service application that monitors the quality of the content, and, if the content quality is below a certain threshold, downloads another version of the content.

17. The set-top box of claim 11, further comprising a communications module that synchronizes the set-top box with one or more other devices and transmits the content to the one or more other devices.

18. The set-top box of claim 11, further comprising a customer service application that monitors one or more performance metrics and providing results of the monitoring to one or more of technical support, regulators, business partners, third parties and suppliers.

19. The set-top box of claim 11, further comprising an intelligent agent module that determines or integrates information about a group to compare viewing choices of the group, wherein viewers within the group have individual set-top boxes, coordinates with the individual set-top boxes to track the viewing choices of the group, develops content recommendations based on viewing choices of the group, wherein the content recommendations comprise making a recommendation to a specific group member, and correlates content watched and resulting updates to a profile in the set-top box.

20. A method to operate a set-top box comprising:
  managing one or more preferences stored in one or more profiles, each of the one or more profiles including personal information and personal preferences, one or more of the personal information and personal preferences being used in association with a service application or a communications application for operation of the service application or the communications application;
  interfacing with one or more internet destinations, the one or more internet destinations including one or more of a social networking site, a blog, an RSS feed and a shared website to one or more of determine content for viewing and suggest content for viewing; and
  correlating viewing habits of a viewer with viewing habits of one or more other viewers using the one or more of the social networking site, the blog, the RSS feed and the shared website to provide the suggested content for viewing, the suggested content for viewing being at least based on positive feedback from the viewer regarding watched content;
  displaying the suggested content to a viewer;
  detecting a word or phrase spoken by the viewer in response to viewing the suggested content; and
  in response to detecting the word or phrase, rewinding the suggested content and adjusting a volume of the suggested content.

* * * * *